United States Patent [19]
McCartney

[11] 3,744,710
[45] July 10, 1973

[54] SUPPORTING SYSTEM FOR CENTRIFUGAL EXTRACTOR AND MOTOR THEREFOR

[75] Inventor: Edward O. McCartney, Newton, Iowa

[73] Assignee: The Maytag Company, Newton, Iowa

[22] Filed: Nov. 29, 1971

[21] Appl. No.: 202,795

[52] U.S. Cl. .................. 233/24, 233/1 C, 248/18
[51] Int. Cl. ................................. B04b 9/02
[58] Field of Search .................. 233/1 B, 1 R, 1 C, 233/23 R, 23 A, 24; 210/360, 368; 192/136; 248/15, 16, 18, 20

[56] References Cited
UNITED STATES PATENTS

| | | | |
|---|---|---|---|
| 1,750,016 | 3/1930 | Meyer | 248/18 X |
| 2,255,514 | 9/1941 | Miller | 248/16 |
| 2,264,202 | 11/1941 | Forney | 248/16 X |
| 816,058 | 3/1906 | Andree | 233/24 X |

Primary Examiner—George H. Krizmanich
Attorney—William G. Landwier et al.

[57] ABSTRACT

A wedge member comprises a portion of a support system for mounting an operating assembly on a base and within a stationary housing of a centrifugal extractor and is selectively movable to effectively adjust the orientation of the operating assembly relative to the stationary housing. The wedge member is formed by a generally diagonal slot cut into a slide block.

14 Claims, 3 Drawing Figures

PATENTED JUL 10 1973
3,744,710
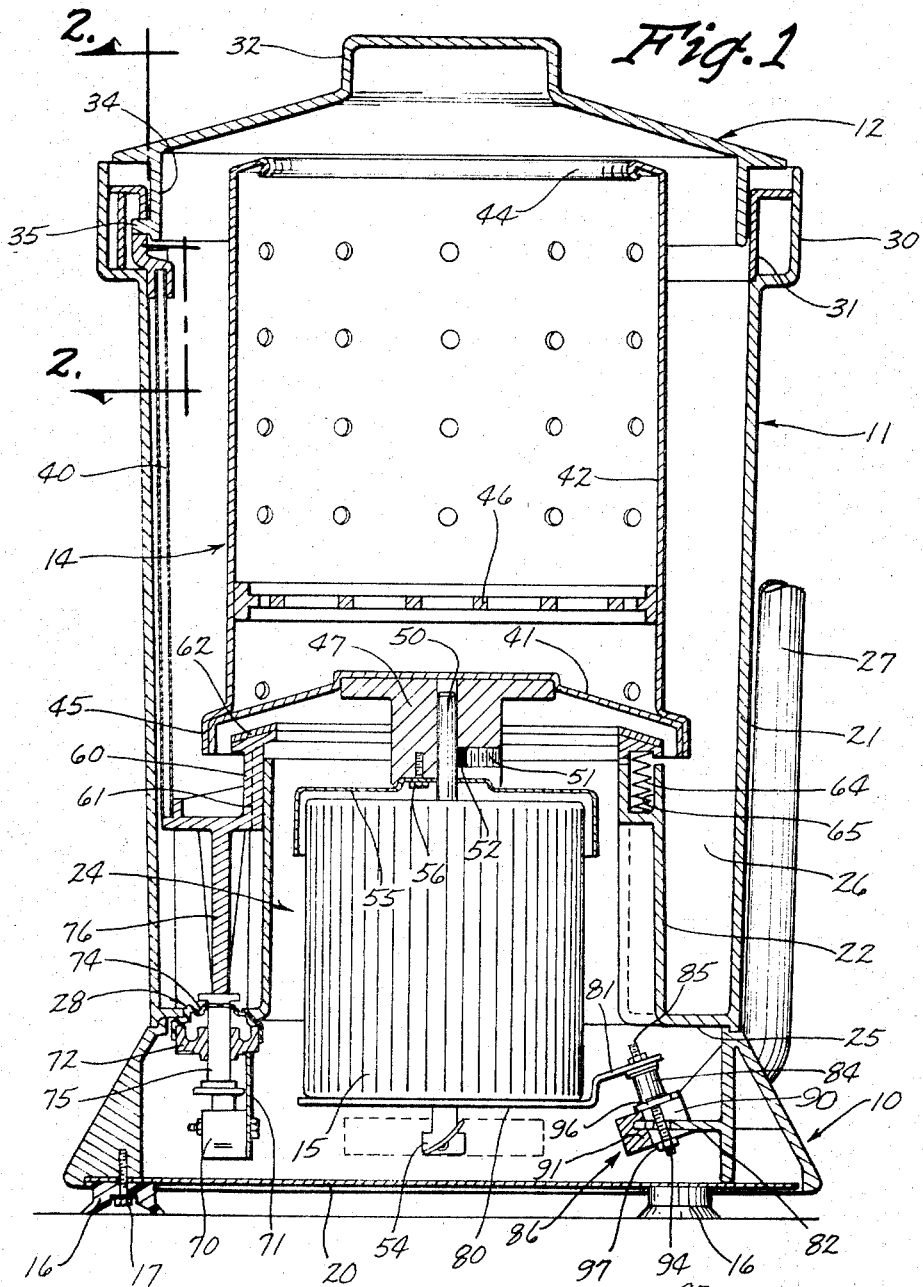
Fig.1
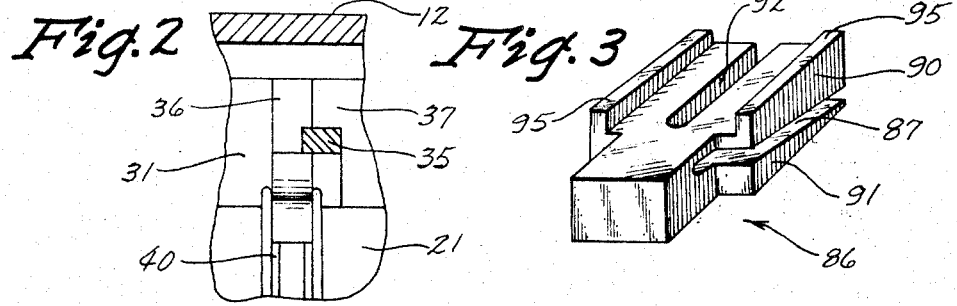
Fig.2
Fig.3

SUPPORTING SYSTEM FOR CENTRIFUGAL EXTRACTOR AND MOTOR THEREFOR

BACKGROUND OF THE INVENTION

1. Field of the Invention

This invention relates to an extractor support system and more particularly to a movable wedge for adjusting the position of the operating assembly.

2. Description of the Prior Art

For smooth vibration-free operation, the spinner of a centrifugal extractor must be centered on the operating axis. Because of manufacturing tolerances it is desirable to provide for adjustable assembly to insure optimum centering.

The applicances in prior art disclosures have provided means for centering a rotating assembly by the adjustment of threaded members. Common usage includes a bolt adjustably threaded into a nut and locked in a selected position by a second nut. Also commonly used are a pair of nuts adjustably threaded on a bolt and tightened down to opposite sides of a supporting bracket. Each of these systems require the adjustment of the nuts on a threaded member and thus adjustment is relatively slow and may require a long threaded member. There is therefore a need for an improved adjustable mounting system for the operating assembly of an extractor.

SUMMARY OF THE INVENTION

It is an object of the instant invention to provide for a centrifugal extractor a supporting system conveniently adjustable to orient the spinner to a predetermined position.

It is a further object of the instant invention to provide for a centrifugal extractor an improved adjustable centering system to position the operating assembly on a central axis.

It is still a further object of the instant invention to provide an improved extractor mounting system including a wedge-shaped member disposed between the operating assembly and the fixed base.

The instant invention achieves these objects in a supporting system for an extractor spinner and including a wedge-shaped member effectively disposed between the base portion of the relatively fixed housing and the operating assembly and selectively movable to alter the position of the operating assembly relative to the fixed housing.

Operation of the device and further objects and advantages thereof will become evident as the description proceeds and from an examination of the accompanying page of drawings.

BRIEF DESCRIPTION OF THE DRAWINGS

The drawings illustrate a preferred embodiment of the invention with similar numerals referring to similar parts throughout the several views wherein:

FIG. 1 is a sectional view taken generally along the longitudinal vertical axis of a centrifugal extractor embodying the instant invention;

FIG. 2 is a fragmentary sectional view of the centrifugal extractor as taken generally along lines 2—2 of FIG. 1; and FIG. 3 is a perspective view of the intermediate adjustable member embodying the wedge-shaped element of the instant invention.

DESCRIPTION OF THE PREFERRED EMBODIMENT

Referring to FIG. 1 there is shown a centrifugal extractor electrically energizable for effecting removal of liquid from fabrics. In the embodiment shown in FIG. 1 the extractor is a compact portable apparatus that may be set on a cabinet or counter top for draining extracted liquid into a sink. The extractor includes the major components of a base 10, housing 11, lid 12, centrifugal spinner 14, and motor 15.

More specifically, the exterior construction includes a base 10 supported on a plurality of feet 16 attached to the base by screws 17. The screws 17 and feet 16 cooperate to removably attach a base cover 20 to the lower side of the base 10 for substantially closing the bottom portion of the extractor.

Positioned on the base and attached thereto is a housing 11 for enclosing the spinner 14 and motor 15 and for defining a fluid reservoir. The housing 11 includes a generally cylindrical imperforate outer wall 21 extending upwardly to a height approximating that of the upper portion of the spinner 14. The housing 11 further includes an imperforate truncated wall 22 spaced inwardly from the outer wall 21. The inner wall 22 is spaced from the axis of the extractor to define a motor cavity 24 along the axis of the extractor. A bottom wall 25 connects the inner and outer walls 21 and 22 to form a generally annular fluid reservoir 26. The bottom wall 25 is imperforate except for a first opening (not shown) connected to the drain hose 27, shown in fragmentary form in FIG. 1, that conducts the extracted fluid from the reservoir 26 to an external drain, and a second opening 28 for accommodating switch operating mechanism as will be further described hereinafter.

The housing 11 further includes a radially enlarged upper flange 30 connected to the outer wall 21 and defining an access into the housing 11. The upper flange 30 receives an internal annular rim 31 that encircles the access. Though the apparatus is portable, the housing 11 and base 10 may be considered as generally stationary housing means.

The lid 12 has a shallow conical shape extending inwardly and upwardly to a central upwardly extending hand grip 32. A depending flange 34 adjacent the outer periphery of the lid 12 telescopes into the annular rim 31 for effectively closing the access opening. The lid 12 further includes a plurality of lugs 35 extending radially outwardly from the depending flange 34 and, as shown in FIG. 2, mate with vertical slots 36 in the rim 31.

At a predetermined vertical orientation of the lugs 35 in the vertical slot 36 the lid 12 is rotatable to effect a detent-type engagement of the lug 35 with a shoulder 37 a control the annular rim 31 to effectively retain the lid 12 in an operative condition. Movement of the lid 12 downwardly in the slot 36 also effects engagement of the lug 35 with the upper end of an actuating rod 40 extends downwardly into the fluid reservoir 26 for effecting acontrol function. Movement of the lid 12 to the detent position, as shown in FIGS. 1 and 2, effectively locks the actuator rod 40 in an operative position.

The spinner or fabric container 14 is disposed for rotation on generally the central axis of the housing 11. The spinner 14 includes an imperforate bottom wall 41 and a perforate generally cylindrical upwardly extending outer wall 42 connected to the bottom wall 41 at its lower end and terminating in an inwardly extending rolled flange 44 at the upper end to form a container for the fabrics. The access of the spinner 14 is defined by the upper flange 44 and is readily convenient for the loading of fabrics into the spinner 14. The lower portion of the sidewall 42 is offset radially outwardly and formed to an outer downwardly extending flange of the bottom wall 41 to form a fluid deflecting flange 45 for directing fluid from the spinner 14 into the fluid reservoir 26. The deflecting flange 45 thus effectively prevents the flow of liquid into the motor compartment 24.

Disposed within the spinner 14 is a grid-like perforate fabric retainer 46. The flexible fabric retainer 46 is placed in the spinner 14 after the clothes have been loaded for retaining the fabric in a lower portion of the spinner during centrifugal operation thereof.

The bottom wall 41 of the spinner 14 is attached to a flanged hug 47 that is in turn connected to the motor shaft 50 by a urethane plug 52 and setscrew 51. The motor 15 is positioned within the compartment 24 defined by the inner housing wall 22 on the generally central axis of the extractor. The shaded pole fractional horsepower motor 15 is operable for rotation at approximately 3500 rpm to effect rotation of the spinner 14 at extraction speeds. Disposed below and driven by the motor 15 is a fan 54 for effectively cooling the motor 15 during extractor operation. An imperforate motor shield 55 is disposed above the motor 15 and connected to the hub 47 by a plurality of screws 56.

A brake system is disposed generally between the bottom of the spinner 14 and the motor 15. The brake system includes an annular frame 60 effectively keyed to the inner housing wall 22 by a plurality of mating splines 61 disposed around the inner surface of the annular brake frame 60 and the outer periphery of the inner wall 22 for permitting axial movement of the brake frame 60 while preventing rotation movement of the brake frame 60 relative to the housing 11. The brake system includes a brake pad 62 fixed to the brake frame 60 and engageable with the bottom wall 41 of the spinner 14. The brake frame 60 is biased axially upwardly for engagement of the brake pad 62 with the bottom wall 41 of the spinner 14 by a plurality of springs 64 angularly spaced around the brake frame 60. Each spring 64 is positioned in a cavity 65 defined by the inner housing wall 22 and is operable on the brake frame 60 for normally effecting engagement of the brake pad 62 with the surface of the bottom wall 41.

As previously indicated, movement of the brake frame 60 is controlled by the lid 12 through the lid lugs 35 and actuating rods 40. In the preferred embodiment, three actuating rods 40 and three springs 64 are operable on the brake frame 60 to control positioning thereof relative to the housing 11 and the spinner 14. Movement of the lid 12 to the access-closing position shown in FIG. 1 operates through the actuating rods 40 to depress the brake frame 60 for spacing the brake pad 62 from the spinner bottom wall 41 and permitting operation of the spinner 14 upon energization of the motor 15.

The motor 15 is connected to an electrical circuit for selective energization thereof to effect operation of the extractor. Included in the circuit is a control switch 70 positioned within the base 10 and mounted to the housing 11 through a bracket 71 fixed to the underside of the housing bottom wall 25. The bracket 71 also supports a plunger guide 72 that in turn clamps an aperture-closing seal 74 between the guide 72 and the housing bottom wall 25.

The switch 70 is operable from a normally open condition to a closed condition responsive to downward movement of a plunger 75 slidingly operable in the guide 72. The upper end of the plunger 75 extends through the aperture-closing seal 74 in the lower housing wall 25 and is engaged by a depending arm 76 of the brake frame 60 for movement of th plunger 75 and operation of the switch 70 to the closed condition when the lid 12 is positioned for disengaging the brake and effecting operation of the extractor as in FIG. 1. When the lid 12 is moved from the operative position, the brake springs 64 move the brake pad 62 into engagement with the spinner 14 and permit operation of the switch 70 to the normally open condition.

The lower end of the motor 15 is fixed to a support plate 80 by threaded fasteners (not shown). This support plate 80 includes a plurality of radially extending arms 81 angularly spaced around the support plate 80 and juxtaposed to similarly spaced brackets 82 formed as part of and extending inwardly from the base 10.

Operatively disposed between each of the overlapping support plate arms 81 and base brackets 82 is a resilient member 84. A nut and bolt at 85 connects one end of the resilient member 84 to the operating assembly through the support plate arm 81. The other end of the resilient member 80 is connected to the housing bracket 82 through an adjustable member 86. The adjustable member 86 is best shown in the perspective view of FIG. 3 and is selectively movable relative to the bracket 82 to effect an adjustment of the orientation of the operating assembly relative to the housing 11.

The adjustable member 86 is basically a rectangular block with a generally diagonally oriented slot 87 partially cut into the block to essentially provide a first wedge-shaped member 90 for disposition between the resilient member 84 and the bracket 82 and a connected second wedge-shaped member 91. The diagonal slot 87 extends from the rear of the member 86, as in FIG. 3, to receive the bracket 82 and to position the second wedge-shaped portion 91 therebelow. The adjustable member 86 further includes a recess 92 that accommodates the connecting bolt 94 extending downwardly from the resilient member 84. The shoulders 95 on the upper side of the adjustable member 86 receive the generally square lower plate 96 of the resilient member 84 and prevent its turning when a nut 97 is tightened onto the bolt 94. As best shown in FIG. 1 the adjustable member 86 is thus horizontally movable in a generally radial direction on the bracket 82 to move the first wedge-shaped portion 90 relative to the housing 11 and operating assembly for effecting a change in the elevation of the supporting plate arm 81 to thereby alter the orientation of the operating assembly relative to the housing 11.

It is seen that as the adjustable member 86 is moved horizontally to reposition the first wedge-shaped portion 90, the operating length of the connecting bolt 94 remains substantially constant because of the second wedge-shaped portion 91 so that adjustment and tightening of the nut 97 to the bolt 94 is simplified and the requirement for an extended length adjustment bolt as used in prior art is avoided.

It is clear that this arrangement will permit raising and lowering of the operating assembly by changing all of the mounts and will permit centering of the operating assembly by changing one or more of the mounts by moving the wedge-shaped portion 90 relative to the bracket 82.

Initiation of extractor operation following the placing of fabrics in the spinner 14, as previously indicated, is controlled by the operator. The operator aligns the lug 35 on the lid 12 with the vertical slot 36 and pushes the lid 12 downwardly in an axial direction against the biasing force of the springs 64 to move the lug 35 through the vertical slot 36. Upon overcoming the biasing force of the springs 64, the vertical movement of the lid 12 effects a downward movement of the actuating rod 40 for moving the brake pad 62 out of engagement with the spinner 14. The terminal movement of the brake frame 60 actuates the switch 70 to the closed position for energizing the motor 15. The lid 12 is then rotated a short angular distance to move the lug 35 into engagement with the shoulder 37 of the annular rim 31 to effectively latch the lid 12 into an operative position. The brake is thus released and the motor 15 is energized for effecting rotation of the spinner 14 to provide a centrifugal fluid extraction operation.

To step the extractor and obtain access to the spinner 14 the process is essentially reversed to effect de-energization of the motor 15 and a braking of the spinner 14. More specifically, the operator first rotates the lid 12 a short distance to release the detent and align the lug 35 with the vertical slot 36. The biasing force provided by the brake springs 64 will move the brake frame 60 in an upwardly direction to effect braking engagement of the brake pad 62 with the spinner bottom wall 41 and through the actuating rods 40 will move the lid 12 upwardly to a rest position if released by the operator. The braking engagement of the brake pad 62 with the spinner 14 brakes or decreases the rotational speed of the spinner 14 through a frictional action between the bottom wall 41 of the spinner 14 and the brake pad surface. The initial movement of the brake frame 60 from the operative position de-energizes the motor 15.

The brake system is operable for achieving a braking of the spinner 14 from approximately 3500 rpm to a stop condition in approximately 2 or 3 seconds. Access to a centrifugally rotating spinner is thus effectively prevented by this brake system.

It is thus clear that the instant invention provides an improved adjustable support for an extractor. The adjustment wedge simplifies adjustment with the relatively constant thickness of the movable adjustment member providing additional advantages.

The invention disclosed herein is related to and disclosed in an application entitled "Spin Control for Centrifugal Extractor" filed by Frank E. Ross as Ser. No. 202,796 on Nov. 29, 1971 and assigned to the assignee of the instant invention.

In the drawings and specification there is set forth a preferred embodiment of the invention and although specific terms are employed these are used in a generic and descriptive sense only and not for purposes of limitation. Changes in form and the proportion of parts as well as the substitution of equivalents are contemplated as circumstances may suggest or render expedient without departing from the spirit and scope of this invention and defined in the following claims.

I claim:

1. In an extractor, the combination comprising: a rotatable container operable at extraction speeds for removing liquid from articles contained therein; housing means generally enclosing said rotatable container; and supporting means for connecting said container to said housing means at a plurality of angularly disposed locations and including a wedge member comprising a first wedge portion operatively disposed between said container and said housing means at at least one of said locations and selectively movable relative to at least one of said container and said housing means for varying the relative position of said rotatable container within said housing means, said wedge member further comprising a second wedge portion connected to said first wedge portion in a reversed posture relative thereto at said one location and movable with said first wedge portion to maintain a generally uniform thickness through said wedge member.

2. In an extractor as defined in claim 1 wherein said supporting means includes resilient means operatively disposed between said container and said housing means whereby said container is resiliently supported within said housing means.

3. In an extractor, the combination comprising: a rotatable container operable at extraction speeds for removing liquid from articles contained therein; supporting structure connected to said rotatable container; housing means generally enclosing said rotatable container and including a mounting means juxtaposed to a portion of said supporting structure at a plurality of angularly disposed locations; a wedge member comprising a first wedge portion operatively disposed between said mounting means and said supporting structure portion at at least one of said locations and movable relative thereto for altering the position of said rotatable container relative to said housing means, said wedge member further comprising a second wedge portion connected to said first wedge portion in a reversed posture relative thereto at said one location and movable with said first wedge portion to maintain a generally uniform thickness through said wedge member; and connection means operable between said mounting means and said supporting structure portion and including means for spanning the generally uniform thickness of said wedge member to connect said supporting structure portion to said mounting means with said first wedge portion in a selected position therebetween whereby said container is supported by said housing means at a selected orientation therewithin.

4. In an extractor as defined in claim 3 wherein said supporting structure includes a drive motor connected to said container through a drive shaft and wherein resilient means is disposed between said supporting structure portion and said mounting means whereby said container and said drive motor are resiliently supported by said housing means at a selected orientation therewithin.

5. In an extractor as defined in claim 3 wherein a wedge member is disposed at each of the plurality of angularly disposed locations and each is individually adjustable to achieve a centering of said container within said housing means.

6. In an extractor as defined in claim 3 wherein said wedge member comprises a selectively movable block-like adjusting member having a generally uniform thickness and a diagonal slot forming said first and second wedge portions and wherein said mounting means comprises a flange for receiving said adjusting member at said slot.

7. In an extractor as defined in claim 6 wherein said connection means includes a bolt effectively operable between said flange and said supporting structure portion and having a generally constant operative length across the generally uniform thickness of said adjusting wedge member.

8. An extractor as defined in claim 6 wherein said flange is generally horizontal and wherein said adjusting member is movable in a generally horizontal direction on said flange to effect a centering of said container within said housing means.

9. In an extractor, the combination comprising: a rotatable container operable at extraction speeds for removing liquid from articles contained therein; supporting structure connected to said rotatable container; housing means generally enclosing said rotatable container and said supporting structure and including a mounting means juxtaposed to a portion of said supporting structure at a plurality of angularly disposed locations; a wedge member comprising a first wedge portion operatively disposed between said mounting means and said supporting structure portion at at least one of said locations and movable relative to at least one of said container and said housing means for altering the position of said rotatable container relative to said housing means, said wedge member further comprising a second wedge portion connected to said first wedge portion in a reversed posture relative thereto at said one location and movable with said first wedge portion to maintain a generally uniform thickness through said wedge member; resilient means associated with said supporting structure and operatively disposed between said housing means and said container; and connection means operable between said mounting means and said supporting structure portion and including means for spanning the generally uniform thickness of said wedge member to connect said container to said housing means through said wedge member and said resilient means whereby said container is resiliently supported by said housing means in a selected orientation therewithin.

10. In an extractor as defined in claim 9 wherein said supporting structure includes a motor connected to said container through a hub and wherein said container and motor is resiliently supported by said housing means in a selected orientation therewithin.

11. In an extractor as defined in claim 9 wherein a wedge member is disposed at each of the plurality of angularly disposed locations and each wedge member is individually movable to effect a centering of said container within said housing means.

12. In an extractor, the combination comprising: a rotatable container operable at extraction speeds for removing liquid from articles contained therein; supporting structure including a hub rigidly connected to said rotatable container and a drive motor connected to said hub through a drive shaft; housing means generally enclosing said rotatable container and said supporting structure and including a bracket juxtaposed to a lower portion of said supporting structure at a plurality of angularly disposed locations; a wedge member comprising a first wedge portion operatively disposed between and engaging said bracket and said supporting structure lower portion at each of said locations and movable relative to at least one of said bracket and said supporting structure for altering the position of said rotatable container within said housing means, said wedge member further comprising a second wedge portion connected to said first wedge portion in a reversed posture relative thereto at said one location and movable with said first wedge portion to maintain a generally uniform thickness through said wedge member; and connection means operable between said bracket and said supporting structure lower portion and including means for spanning the generally uniform thickness of said wedge member to mount said container and said drive motor at a selected orientation within said housing means through said supporting structure lower portion, said wedge member, and said bracket.

13. In an extractor as defined in claim 12 and further including resilient means disposed between said bracket and the lower portion of said supporting structure for resiliently supporting said container and said drive motor within said housing means.

14. In an extractor as defined in claim 13 wherein each of said wedge members is individually movable relative to said bracket to effect a resilient centering of said container and drive motor to a selected orientation within said housing means.

* * * * *